(12) United States Patent
Nishiwaki

(10) Patent No.: US 6,847,470 B2
(45) Date of Patent: *Jan. 25, 2005

(54) PRINTING CONTROL DEVICE AND IMAGE PROCESSING APPARATUS USING THE SAME

(75) Inventor: Hirofumi Nishiwaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 862 days.

This patent is subject to a terminal disclaimer.

(21) Appl. No.: 09/799,021

(22) Filed: Mar. 6, 2001

(65) Prior Publication Data
US 2001/0021032 A1 Sep. 13, 2001

(51) Int. Cl.[7] ............................................ G06K 15/00
(52) U.S. Cl. ........................................ 358/1.9; 358/1.13
(58) Field of Search ..................... 358/1.1, 1.9, 1.13, 358/1.15, 530, 443, 444, 442, 296

(56) References Cited

U.S. PATENT DOCUMENTS 5,132,719 A * 7/1992 Kioka et al. ................ 355/24
5,506,657 A * 4/1996 Ito et al. ..................... 399/411

* cited by examiner

Primary Examiner—Arthur G. Evans
(74) Attorney, Agent, or Firm—Oblon, Spivak, McClelland, Maier & Neustadt, P.C.

(57) ABSTRACT

A printing control device of the present invention is provided for a digital complex system having an automatic color sensing function and an interleaving print function. In the printing control device, a receiving unit receives a print request. A detection unit detects that a preceding printing task is active when the print request is received. An interleave printing control unit controls the interleaving print function such that, when a print mode of the received print request is different from a print mode of the active preceding printing task, execution of the interleaving print function is inhibited, and only when the print mode of the received print request is the same as the print mode of the active preceding printing task, the execution of the interleaving print operation is allowed.

7 Claims, 3 Drawing Sheets

| APPLICATION PROGRAMS | IMAGE TYPE | NO. OF PAGES OF SINGLE RUN | COLOR PRINTING PRIORITY | B/W PRINTING PRIORITY |
|---|---|---|---|---|
| PRINTER | ACS | 20 | 10 | 10 |
| COPIER | COLOR | 40 | 10 | 1 |
| FAX | B/W | 2 | 1 | 10 |

PRINTING CONTROL DEVICE AND IMAGE PROCESSING APPARATUS USING THE SAME

BACKGROUND OF THE INVENTION

1. Field of the Invention

The present invention generally relates to a printing control device that is operable in a color print mode, and more particularly to a printing control device that is appropriate for use in a digital complex system, such as a multi-function color printer or copier, which is provided with an automatic color sensing (ACS) ability and an interleaving print ability. Further, the present invention relates to an image processing apparatus in which the printing control device is provided.

2. Description of the Related Art

Generally, a color printing device is capable of switching from one of the color print mode and the black-and-white (B/W) print mode to the other. In the color print mode, the printing hardware uses all the four colors of cyan, magenta, yellow and black to print a color image. In the B/W (or monochrome) print mode, the printing hardware uses only black to print a black-and-white image. If the switching between the color print mode and the B/W print mode occurs frequently, the printing hardware is liable to reduction of the continuous printing speed and lowering of the device durability.

A conventional color printing device is provided with an automatic color sensing (ACS) ability. This printing device has a means for detecting color data contained in the printing data of a print request that is transmitted from a host computer to the printing device. With the ACS ability, the printing device is capable of automatically switching from one of the color print mode and the black-and-white (B/W) print mode to the other in response to the color sensing result.

A conventional digital complex system is provided with multiple image processing functions including the printer function, the fax function, the copier function and others, which are combined into a single system. The digital complex system usually has only one printing hardware, and the printing hardware must be shared by the multiple functions when executing a sequence of printing tasks by using the multiple functions.

To eliminate the problem, the conventional digital complex system has an interleaving print function. The interleaving print function is to arrange the printer, copier, fax and other application programs in the complex system such that sequential printing tasks occur in different application programs. With the interleaving print function, the complex system gives to the users such an impression as if the complex system can concurrently execute all the multiple functions. Actually, during execution of the interleaving printing function, one of the plurality of application programs is sequentially switched to another every time the printing of a predetermined number of images (or pages) for one of the sequential printing tasks on the printing hardware is finished.

In a digital complex system of the above type, the printing device (or the printing hardware) is provided with the ACS ability, and a problem arises when, in response to a received print request, the ACS function causes the switching between the color print mode and the B/W print mode to automatically occur during execution of the interleaving printing function. In other words, one of the plurality of application programs is sequentially switched to another every time the printing of the predetermined number of pages for one of the sequential printing tasks on the printing hardware is finished, and under such circumstances, the color/monochrome print mode switching is caused to occur for every timing of the application program switching. As the color/monochrome print mode switching will occur very frequently in such a case, the printing device of the above-mentioned digital complex system is more liable to reduction of the continuous printing speed and lowering of the device durability.

SUMMARY OF THE INVENTION

Accordingly, it is an object of the present invention to provide an improved printing control device in which the above-described problems are eliminated.

Another object of the present invention is to provide a printing control device that promotes effective use of the automatic color sensing ability and the interleaving print function of a digital complex system in order for preventing the reduction of the continuous printing speed and the lowering of the device durability as in the conventional digital complex system.

Another object of the present invention is to provide an image processing apparatus in which the printing control device is provided to promote effective use of the automatic color sensing ability and the interleaving print function of a digital complex system in order for preventing the reduction of the continuous printing speed and the lowering of the device durability as in the conventional digital complex system.

The above-mentioned objects of the present invention are achieved by a printing control device for use in a digital complex system having an automatic color sensing function and an interleaving print function, the printing control device comprising: a receiving unit which receives a print request; a detection unit which detects that a preceding printing task is active when the print request is received; and an interleave printing control unit which controls the interleaving print function such that, when a print mode of the received print request is different from a print mode of the active preceding printing task, execution of the interleaving print function is inhibited, and only when the print mode of the received print request is the same as the print mode of the active preceding printing task, the execution of the interleaving print operation is allowed.

The above-mentioned objects of the present invention are achieved by a printing control device for use in a digital complex system having an automatic color sensing function and an interleaving print function, the printing control device comprising: a receiving unit which receives a print request; a detection unit which detects that a preceding printing task is active when the print request is received; and an interleave printing control unit which controls the interleaving print function such that, when a print mode of the received print request is different from a print mode of the active preceding printing task, low priority is assigned to a printing task of the received print request, and, during execution of the interleaving print function, the active preceding printing task is performed with high priority and the printing task of the received print request is performed with low priority.

It is possible for the printing control device of the present invention to effectively use both the automatic color sensing function and the interleaving print function of the digital complex system by allowing the execution of the interleaving print operation only when the print mode of the received print request is the same as the print mode of the active preceding printing task. Further, it is possible for the printing control device of the present invention to effectively use both the automatic color sensing function and the interleaving print function of the digital complex system by assigning low priority to the received print request when it carries the print mode that is different from the print mode of the active preceding printing task. The printing control device and the image processing apparatus of the present invention are effective in preventing the reduction of the continuous printing speed and the lowering of the device durability as in the conventional digital complex system.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will be given of preferred embodiments of the optical scanning device and the image forming apparatus of the present invention with reference to the accompanying drawings.

Figure 1:
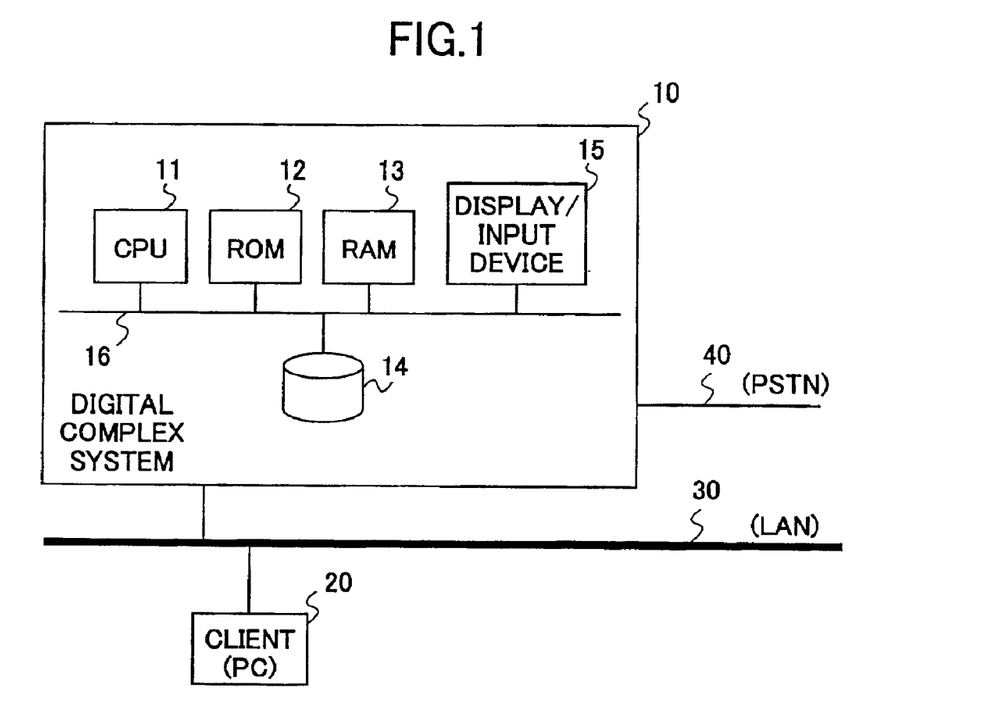
FIG. 1 is a block diagram of a digital complex system to which one preferred embodiment of the printing control device of the invention is applied.

FIG. 1 shows a digital complex system to which one preferred embodiment of the printing control device of the invention is applied.

As shown in FIG. 1, the digital complex system 10 is connected to a personal computer (PC) 20 via a local area network (LAN) cable 30. In the LAN system on the LAN cable 30, the PC 20 acts as a client computer and the digital complex system 10 serves as a print server. In the present embodiment, the LAN cable 30 interconnects the digital complex system 10 and the PC 20. However, the present invention is not limited to this embodiment. Alternatively, a general-purpose interface cable, a private line or a two-way parallel interface line may be used to connect the digital complex system 10 and the PC 20.

In the digital complex system 10 of FIG. 1, only the configuration of a controller is illustrated, and the printing hardware and other modules, which are essentially the same as those corresponding elements of the conventional system, are omitted. The printing control device of the present invention is applied to the controller of the digital complex system 10.

The digital complex system 10 of FIG. 1 is provided with multiple image processing functions including the printer function, the fax function, the copier function and others, which are combined into a single system. Similar to the conventional digital complex system, the digital complex system 10 has an interleaving print function. The interleaving print function is to arrange the printer, copier, fax and other application programs in the digital complex system 10 such that sequential printing tasks occur in different application programs.

Further, the digital complex system 10 of FIG. 10 is provided with an automatic color sensing (ACS) function. The digital complex system 10 has a color sensing device (not shown), which detects whether color data is contained in the printing data of a print request that is transmitted from the PC 20 to the digital complex system 10. With the ACS function, the digital complex system 10 automatically switches from one of the color print mode and the black-and-white (B/W) print mode to the other in response to the result of color data detection at the color sensing device.

Further, in the digital complex system 10 of FIG. 1, the printing control device of the present invention carries out an interleave printing control process in which the previously described problems of the conventional digital complex system are eliminated. An interleaving printing control program that allows execution of the interleave printing control process on the digital complex system 10 is installed into the controller of the digital complex system 10. Some preferred embodiments of the interleave printing control process according to the present invention will described below.

As described above, in the digital complex system 10 of FIG. 1, the PC 20, which acts as the client computer in the LAN system, transmits a print request to the controller of the digital complex system 10 via the LAN cable 30, and the print request, received at the controller, contains the printing data and a print mode designation. The printing hardware of the digital complex system 10 prints an image on paper based on the received printing data. The print mode designation is provided in the print request to indicate, to the controller, a requested one of the color print mode and the B/W print mode in which the image of the printing data should be printed on paper.

As shown in FIG. 1, in the controller of the digital complex system 10, a CPU (central processing unit) 11, a ROM (read-only memory) 12, a RAM (random access memory) 13, a storage device 14, and a display/input device 15 are provided. These elements of the controller are interconnected by a local bus 16. The storage device 14 may be externally attached to the controller. Alternatively, the storage device 14 may be integrally built in the controller. The storage device 14 stores the printing data and other image data, which are delivered from the PC 20 to the controller of the digital complex system 10.

Further, in the digital complex system 10 of FIG. 1, the ROM 12 stores various control programs, application programs and operational parameters related to the digital complex system 10. The CPU 11 executes the programs, read from the ROM 12, so that the CPU 11 controls the image processing functions, including the printer function, the fax function, the copier function and others, which are provided in the digital complex system 10. The RAM 13 provides working memory areas, which are used by the CPU 11 during the execution of the programs. The RAM 13 may be configured into an alternative memory of the storage device 12 that stores the printing data and other image data received from the PC 20. The display/input device 15 provides the user with indications of operational conditions of the digital complex system 10 and means for inputting the user's instructions and settings to the system.

Further, in the digital complex system 10 of FIG. 1, a fax device (not shown) is provided to carry out the fax function as one of the multiple functions, and the fax device is connected to a public switched telephone network (PSTN) 40. Transmission and receiving of fax images can be performed between the digital complex system 10 and another communication device on the PSTN 40. Fax images are printed usually in the B/W print mode on the digital complex system 10.

Further, in the digital complex system 10 of FIG. 1, a scanner device (not shown) is provided to carry out the copier function as one of the multiple functions. Image data that is optically detected from an original document by using the scanner device is supplied to the printing hardware so that the printing hardware prints the image data on paper. Such images are printed in either the color print mode or the B/W print mode on the digital complex system 10, which depends on the user's instructions given at a start of execution of the copier function. During the execution of the copier function on the digital complex system 10, the automatic switching between the color print mode and the B/W print mode hardly occurs.

Next, a description will be given of preferred embodiments of the interleave printing control process executed by the printing control device of the digital complex system of FIG. 1.

As described above, the control program that allows execution of the interleave printing control process on the digital complex system 10 is installed into the ROM 12 of the digital complex system 10, and the CPU 11 reads the control program from the ROM 12 and the CPU 11 executes the interleave printing control process in accordance with the control program.

Figure 3:
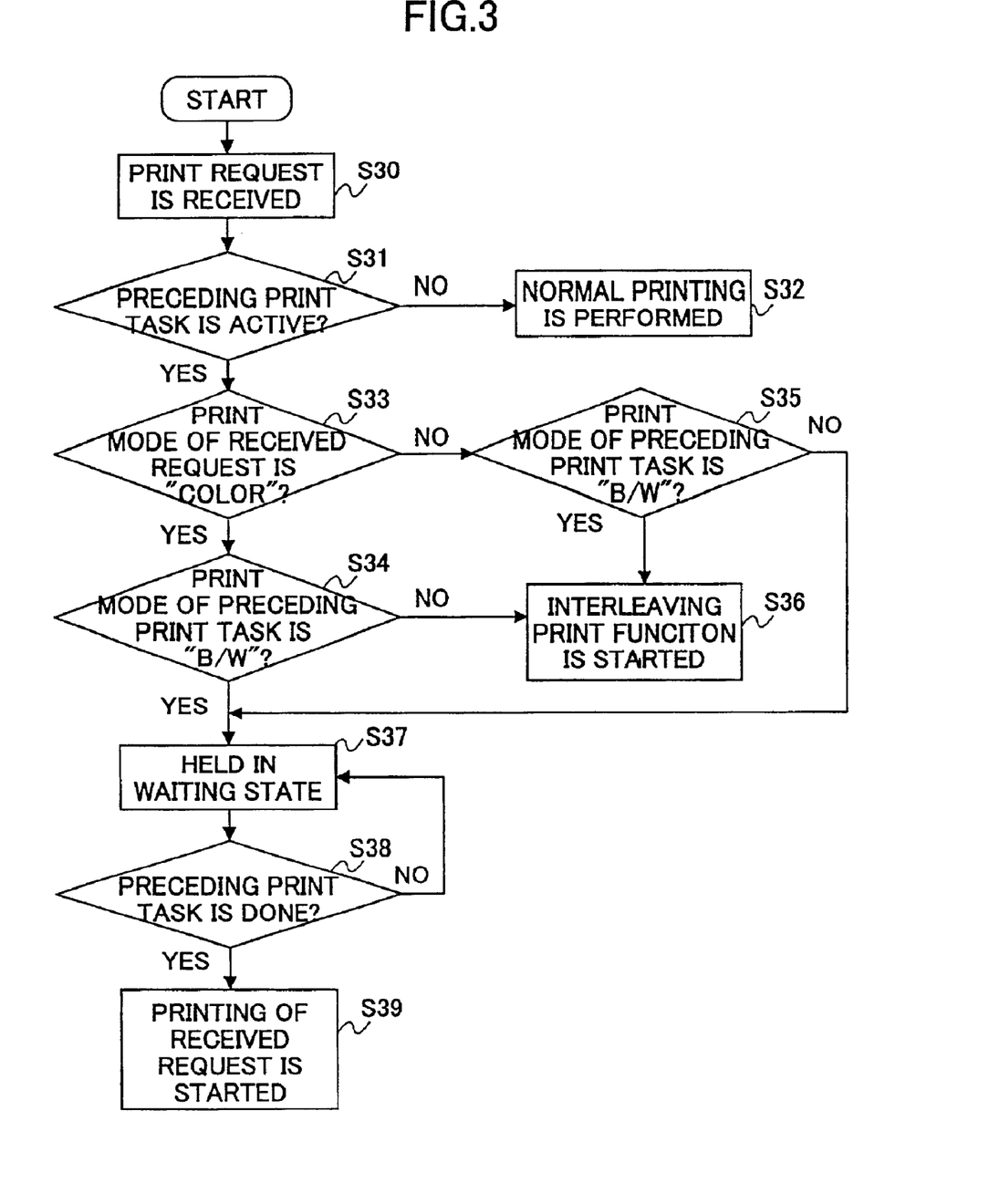
FIG. 3 is a flowchart for explaining one embodiment of an interleave printing control process executed by the printing control device of the digital complex system of FIG. 1.

FIG. 3 shows a first preferred embodiment of the interleave printing control process executed by the printing control device of the digital complex system of FIG. 1.

As previously described, in the conventional digital complex system, the printing hardware is provided with the automatic color sensing (ACS) function, and, in response to a received print request, the ACS function may cause the switching between the color print mode and the B/W (or monochrome) print mode to automatically occur during execution of the interleaving printing function. During execution of the interleaving printing function, one of the application programs in the conventional digital complex system is sequentially switched to another every time the printing of a predetermined number of pages (e.g., 5 pages) for one of the sequential printing tasks on the printing hardware (which printing will be called the single-run printing) is finished. As the color/monochrome print mode switching will occur frequently in such a case, the printing device of the conventional digital complex system is liable to the reduction of the continuous printing speed and the lowering of the device durability.

In order to eliminate the above problems, in the interleave printing control process of the present embodiment, when the print mode of a received print request is different from the print mode of the active preceding printing task, the execution of the interleaving print operation is inhibited, and only when the print mode of the received print request is the same as the print mode of the active preceding printing task, the execution of the interleaving print operation is allowed.

As shown in FIG. 3, in the present embodiment, the CPU 11 of the digital complex system 10 at step S30 starts execution of the interleave printing control process when the CPU 11 receives a print request from one of the application programs in the digital complex system 10. This print request is issued by the copier application program if the copier function of the system 10 is started by the operator, by the printer application program if a request for executing the printer function of the system 10 is transmitted from the PC 20 to the system 10 via the LAN cable 30, or by the fax application program if a fax image is transmitted from the PSTN 40 to the system 10.

After the step S30 is performed, the CPU 11 at step S31 determines whether a preceding printing task on the printing hardware is currently active. When there is no active preceding printing task on the printing hardware, the print mode, carried by the print request, never conflicts with the print mode of the preceding printing task when starting the interleaving print function. Namely, when the result at step S31 is negative, the CPU 11 at step S32 causes the printing hardware to perform the normal printing process for the printing task of the received print request.

On the other hand, when the result at step S31 is affirmative, there is a possibility that the print mode of the received print request conflicts with the print mode of the preceding printing task when starting the interleaving print function. The CPU 11 at step S33 determines whether the print mode of the received print request is the color print mode. When the result at step S33 is negative (or the received print request carries the B/W print mode), the CPU 11 at step S35 determines whether the print mode of the active preceding printing task is the B/W print mode. When the result at step S35 is affirmative (or the preceding printing task is of the B/W print mode), the print mode of the received print request is the same as the print mode of the active preceding printing task. The CPU 11, in this case, at step S36 causes the printing hardware to start the execution of the interleaving print function for the active preceding printing task and the printing task of the received print request.

When the result at step S35 is negative (or the preceding printing task is of the color print mode), the print mode of the received print request is different from the print mode of the active preceding printing task. In this case, the CPU 11 performs the next step S37, which will be described below.

When the result at step S33 is affirmative (or the received print request carries the color print mode), the CPU 11 at step S34 determines whether the print mode of the active preceding printing task is the B/W print mode. When the result at step S34 is negative (or the preceding printing task is of the color print mode), the print mode of the received print request is the same as the print mode of the active preceding printing task. The CPU 11, in this case, at the step S36 causes the printing hardware to start the execution of the interleaving print function for the active preceding printing task and the printing task of the received print request.

On the other hand, when the result at step S34 is affirmative (or the preceding printing task is of the B/W print mode), the print mode of the received print request is different from the print mode of the active preceding printing task. The CPU 11, in this case, at step S37 holds the printing task of the received print request in a waiting state.

The CPU 11 at step S38 determines whether the preceding printing task is complete. Until the execution of the preceding printing task ends, the printing task of the received print request is held in the waiting state. When the result at step S38 is affirmative (or the preceding printing task is complete), the CPU 11 at step S39 starts the execution of the printing task of the received print request. Therefore, according to the interleave printing control process of the present embodiment, the execution of the interleaving print function for the printing task of the received print request is inhibited when the print mode of the received print request is different from the print mode of the active preceding printing task.

It is possible for the printing control device of the above-described embodiment to effectively use both the ACS function and the interleaving print function of the digital complex system 10 by allowing the execution of the interleaving print operation only when the print mode of the received print request is the same as the print mode of the active preceding printing task. The printing control device of the above-described embodiment is effective in preventing the reduction of the continuous printing speed and the lowering of the device durability as in the conventional digital complex system.

Figure 4:
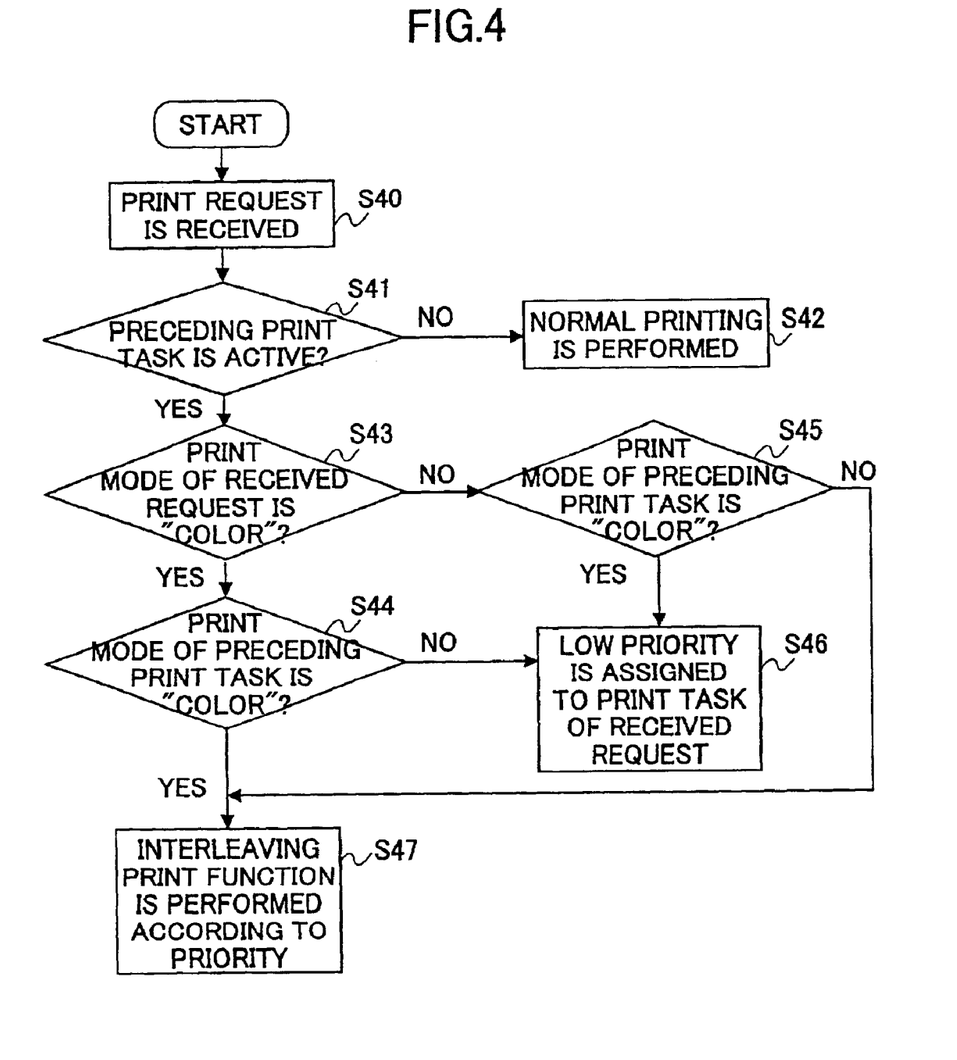
FIG. 4 is a flowchart for explaining another embodiment of the interleave printing control process executed by the printing control device of the digital complex system of FIG. 1.

Next, FIG. 4 shows a second preferred embodiment of the interleave printing control process executed by the printing control device of the digital complex system of FIG. 1.

In the present embodiment, when the print mode of a received print request is different from the print mode of the active preceding printing task, low priority is assigned to the printing task of the received print request, and the interleaving print function for the active preceding printing task and the printing task of the received print request is performed according to the priority of each printing task. During the execution of the interleaving print function, the preceding printing task of the first print mode is performed with high priority and the printing task of the following print request carrying the second different print mode is performed with low priority. Thereby, the interleave printing control process of the present embodiment prevents the reduction of the continuous printing speed and the lowering of the device durability as in the conventional digital complex system.

As shown in FIG. 4, in the present embodiment, the CPU 11 of the digital complex system 10 at step S40 starts execution of the interleave printing control process when the CPU 11 receives a print request from one of the application programs in the digital complex system 10. The print request is issued by the copier application program if the copier function of the system 10 is started by the operator, by the printer application program if a request for executing the printer function of the system 10 is transmitted from the PC 20 to the system 10 via the LAN cable 30, or by the fax application program if a fax image is transmitted from the PSTN 40 to the system 10.

After the step S40 is performed, the CPU 11 at step S41 determines whether a preceding printing task on the printing hardware is currently active. When there is no active preceding printing task on the printing hardware, the print mode, carried by the print request, never conflicts with the print mode of the preceding printing task when starting the interleaving print function. Namely, when the result at step S41 is negative, the CPU 11 at step S42 causes the printing hardware to perform the normal printing process for the printing task of the received print request.

On the other hand, when the result at step S41 is affirmative, there is a possibility that the print mode of the received print request conflicts with the print mode of the preceding printing task when starting the interleaving print function. The CPU 11 at step S43 determines whether the print mode of the received print request is the color print mode. When the result at step S43 is negative (or the received print request carries the B/W print mode), the CPU 11 at step S45 determines whether the print mode of the active preceding printing task is the color print mode. When the result at step S45 is affirmative (or the preceding printing task is of the color print mode), the print mode of the received print request is different from the print mode of the active preceding printing task. The CPU 11, in this case, at step S46 assigns low priority to the printing task of the received print request. After the step S46 is performed, the CPU 11 performs the next step S47, which will be described below.

When the result at step S45 is negative (or the preceding printing task is of the B/W print mode), the print mode of the received print request is the same as the print mode of the active preceding printing task. In this case, the CPU 11 performs the next step S47 (which will be described below) and does not perform the step S46.

When the result at step S43 is affirmative (or the received print request carries the color print mode), the CPU 11 at step S44 determines whether the print mode of the active preceding printing task is the color print mode. When the result at step S44 is negative (or the preceding printing task is of the B/W print mode), the print mode of the received print request is different from the print mode of the active preceding printing task. The CPU 11, in this case, performs the above step S46 so that low priority is assigned to the printing task of the received print request. The CPU 11 then performs the next step S47, which will be described below.

On the other hand, when the result at step S44 is affirmative (or the preceding printing task is of the color print mode), the print mode of the received print request is the same as the print mode of the active preceding printing task. The CPU 11, in this case, at step S47 causes the printing hardware to perform the interleaving print function for the preceding printing task and the printing task of the received print request according to the priority of each printing task.

Therefore, according to the interleave printing control process of the present embodiment, during the execution of the interleaving print function, the preceding printing task of the first print mode is performed with high priority and the following printing task of the received print request carrying the second, different print mode is performed with low priority. Such a control process is allowed when the print mode of the received print request is different from the print mode of the active preceding printing task.

Figure 2:
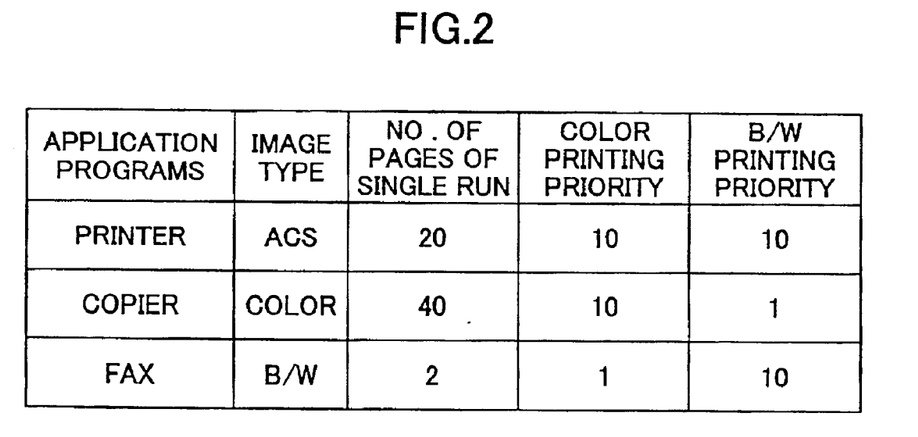
FIG. 2 is a diagram for explaining an interleaving print priority allocation used by the printing control device of the digital complex system of FIG. 1.

Regarding the setting of interleaving print priority for each printing task, FIG. 2 shows an interleaving print priority allocation used by the printing control device of the digital complex system of FIG. 1.

In the interleaving print priority allocation of FIG. 2, the first-row printing task is of the printer application program, the second-row printing task is of the copier application program, and the third-row printing task is of the fax application program. In the present example, it is assumed that the first-row printing task is the active preceding printing task, and one of the second-row printing task and the third-row printing task is caused by a subsequent print request.

As shown in FIG. 2, the image types of the three printing tasks are the ACS, the color and the B/W; the number of pages of the interleaving-print single run of the three printing tasks are 20, 40 and 2; the color-print-mode priority values of the three printing tasks are 10, 10 and 1; and the B/W-print-mode priority values of the three printing tasks are 10, 1 and 10.

Suppose that the first-row printing task (the printer application program) is being performed in the color print mode and that the second-row printing task (the copier application program) is subsequently caused by a received print request.

The received print request in this case carries the color print mode that is the same as the print mode of the active preceding printing task. In the interleaving print priority allocation used by the printing control device of the present embodiment, the color-print-mode priority values of both the printing tasks are 10 as shown in FIG. 2. In this case, the interleaving print function is performed (the step S47 of FIG. 4) such that the preceding printing task and the following printing task of the received print request are sequentially performed with the same priority.

Suppose that the first-row printing task (the printer application program) is being performed in the color print mode and that the third-row printing task (the fax application program) is subsequently caused by a received print request. The received print request in this case carries the B/W print mode that is different from the print mode of the active preceding printing task. In the interleaving print priority allocation used by the printing control device of the present embodiment, the color-print-mode priority value of the first-row printing task is 10 (high priority) and the color-print-mode priority value of the third-row printing task is 1 (low priority) as shown in FIG. 2. In this case, the interleaving print function is performed (the step S47 of FIG. 4) such that the preceding printing task is performed with high priority and the following printing task of the received print request is performed with low priority. The printing control device of the present embodiment uses the interleaving print priority allocation of FIG. 2, and, as in the step S46 of FIG. 4, the low priority is assigned to the printing task of the received print request.

Alternatively, instead of the assignment of the low priority, a small number of pages of the interleaving-print single run may be assigned to the printing task of the received print request. When the small number of pages is assigned, the time needed for the execution of one of the repeated printing task cycles of the received print request during the interleaving print function is reduced. Similar to the assignment of the low priority, it is possible to effectively use both the ACS function and the interleaving print function of the digital complex system 10.

In the example of FIG. 2, as the printer application program uses the ACS function, the switching from the color print mode to the B/W print mode may occur when the preceding printing task (the copier application program) is active and the print request (the fax application program) is received. In such a case, the B/W-print-mode priority values of the interleaving print priority allocation are used by the printing control device of the present embodiment. The B/W-print-mode priority value of the second-row printing task is 1 (low priority) and the B/W-print-mode priority value of the third-row printing task is 10 (high priority) as shown in FIG. 2. In this case, the interleaving print function is performed (the step S47 of FIG. 4) such that the preceding printing task is performed with low priority and the following printing task of the received print request is performed with high priority. The sequence of the two printing tasks is reversed.

It is possible for the printing control device of the above-described embodiment to effectively use both the ACS function and the interleaving print function of the digital complex system 10 by assigning low priority to the printing task of the received print request when it carries the print mode that is different from the print mode of the active preceding printing task. The printing control device of the above-described embodiment is effective in preventing the reduction of the continuous printing speed and the lowering of the device durability as in the conventional digital complex system.

The present invention is not limited to the above-described embodiments, and variations and modifications may be made without departing from the scope of the present invention.

Further, the present invention is based on Japanese priority application No.2000-061932, filed on Mar. 7, 2000, the entire contents of which are hereby incorporated by reference.

What is claimed is:

1. A printing control device for use in a digital complex system having an automatic color sensing function and an interleaving print function, comprising:

a receiving unit receiving a print request;

a detection unit detecting that a preceding printing task is active when the print request is received; and an interleave printing control unit controlling the interleaving print function such that, when a print mode of the received print request is different from a print mode of the active preceding printing task, execution of the interleaving print function is inhibited, and only when the print mode of the received print request is the same as the print mode of the active preceding printing task, the execution of the interleaving print operation is allowed.

2. A printing control device for use in a digital complex system having an automatic color sensing function and an interleaving print function, comprising:

a receiving unit receiving a print request;

a detection unit detecting that a preceding printing task is active when the print request is received; and an interleave printing control unit controlling the interleaving print function such that, when a print mode of the received print request is different from a print mode of the active preceding printing task, low priority is assigned to a printing task of the received print request, and, during execution of the interleaving print function, the active preceding printing task is performed with high priority and the printing task of the received print request is performed with low priority.

3. The printing control device according to claim 2, wherein the interleave printing control unit is configured to assign a small number of pages of an interleaving-print single run to the printing task of the received print request, in addition to the assignment of low priority, when the print mode of the received print request is different from the print mode of the active preceding printing task.

4. The printing control device according to claim 2, wherein the interleave printing control unit is configured to assign low priority to the printing task of the received print request and assign high priority to the active preceding printing task when the print mode of the received print request is different from the print mode of the active preceding printing task.

5. The printing control device according to claim 2, wherein the interleave printing control unit is configured to assign a small number of pages of an interleaving-print single run to the printing task of the received print request and assign a large number of pages of the interleaving-print single run to the active preceding printing task when the print mode of the received print request is different from the print mode of the active preceding printing task.

6. An image processing apparatus comprising:

a digital complex device having an automatic color sensing function and an interleaving print function; and a printing control device, wherein the printing control device comprises:

a receiving unit receiving a print request;

a detection unit detecting that a preceding printing task is active when the print request is received; and an interleave printing control unit controlling the interleaving print function such that, when a print mode of the received print request is different from a print mode of the active preceding printing task, execution of the interleaving print function is inhibited, and only when the print mode of the received print request is the same as the print mode of the active preceding printing task, the execution of the interleaving print operation is allowed.

7. An image processing apparatus comprising:

a digital complex device having an automatic color sensing function and an interleaving print function; and a printing control device, wherein the printing control device comprises:

a receiving unit receiving a print request;

a detection unit detecting that a preceding printing task is active when the print request is received; and an interleave printing control unit controlling the interleaving print function such that, when a print mode of the received print request is different from a print mode of the active preceding printing task, low priority is assigned to a printing task of the received print request, and, during execution of the interleaving print function, the active preceding printing task is performed with high priority and the printing task of the received print request is performed with low priority.

* * * * *

UNITED STATES PATENT AND TRADEMARK OFFICE
CERTIFICATE OF CORRECTION

PATENT NO. : 6,847,470 B2
DATED : January 25, 2005
INVENTOR(S) : Nishiwaki

It is certified that error appears in the above-identified patent and that said Letters Patent is hereby corrected as shown below:

Title page,
Item [75], Inventors, should read:
-- [75] Inventor: Hirofumi Nishiwaki, Kanagawa (JP) --
Items [45] and [*] Notice, should read as follows:
-- [45] Date of Patent: January 25, 2005

[*] Notice: Subject to any disclaimer, the term of this patent is extended or adjusted under 35 U.S.C. 154(b) by 862 days. --
Item [30], Foreign Application Priority Data, should read:
-- [30]  Foreign Application Priority Data

March 7, 2000  (JP).....................2000-061932 --

Signed and Sealed this

Twenty-sixth Day of April, 2005

JON W. DUDAS
*Director of the United States Patent and Trademark Office*